(No Model.)
G. B. N. DOW & J. H. WILLEY.
WHIFFLETREE.
No. 387,216.                     Patented Aug. 7, 1888.
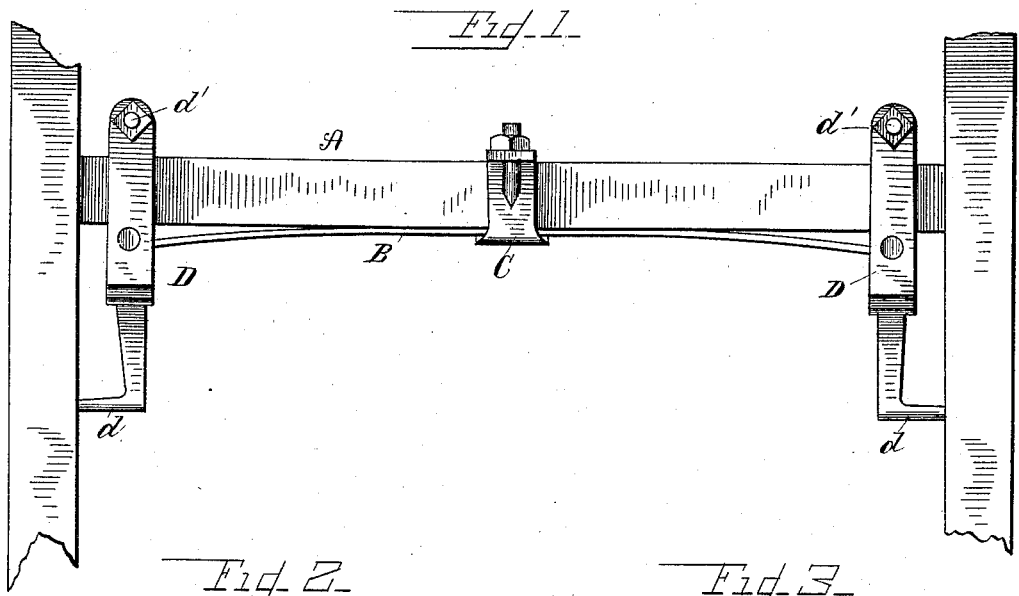
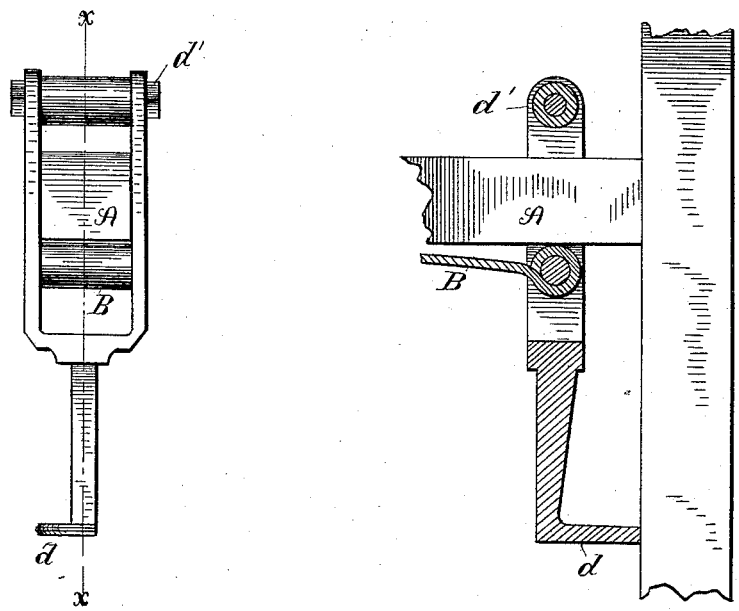
Witnesses,
G. A. Tauberschmitt
Wm. M. Stockbridge
Inventors:
Geo. B. N. Dow
John H. Willey
By their Attorney
V. D. Stockbridge

UNITED STATES PATENT OFFICE.

GEORGE B. N. DOW AND JOHN H. WILLEY, OF MANCHESTER, NEW HAMPSHIRE.

WHIFFLETREE.

SPECIFICATION forming part of Letters Patent No. 387,216, dated August 7, 1888.

Application filed May 3, 1888. Serial No. 272,625. (No model.)

*To all whom it may concern:*

Be it known that we, GEORGE B. N. DOW and JOHN H. WILLEY, citizens of the United States, residing at Manchester, in the county of Hillsborough and State of New Hampshire, have invented certain new and useful Improvements in Whiffletrees; and we do hereby declare the following to be a full, clear, and exact description of the invention, such as will enable others skilled in the art to which it appertains to make and use the same.

Our invention relates to improvements in whiffletrees, the same being applicable to both single and double trees.

The object of the invention is to provide means whereby, when the vehicle to which the whiffletree is attached is started by a sudden jerk of the horse, there will be no disagreeable shock to the occupants thereof; also, to prevent the same shock when traveling over rough roads, caused by unevenness of the road or by striking large stones, and the like.

The invention consists in the combination of a bar, a relief-spring arranged in front of said bar, and yokes carrying tug hooks or catches pivotally connected with the spring and embracing the bar.

In the drawings forming a part of this specification, Figure 1 is a plan showing our invention as applied to a vehicle. Fig. 2 is an end view of the whiffletree, the shaft being removed, showing one of the yokes in elevation; and Fig. 3 is a section on the line $x\ x$ of Fig. 2.

A is a cross-bar or the whiffletree proper.

B is the relief-spring secured to the front side of the bar A by means of a suitable clip, C. The spring is by preference a simple flat straight one, and is thus adapted to be turned and reversed as occasion may require.

D D are yokes, each carrying a hook or catch, $d$, for connection with the harness-tugs. The yokes are pivoted to the ends of the relief-spring and extend around the bar A, as shown.

$d'\ d'$ are removable bolts or pins, upon which are mounted rubber cushions or supplemental surge-relievers.

The spring in front of the bar serves to relieve the animal from shocks due to obstructions to the load, and the yokes and bolts around the bar make a secure and permanent attachment with the load.

It should be observed that in case the pivotal connection between the yokes and the spring becomes worn and breaks there will still remain connection with the bar.

By taking out the bolts $d'\ d'$ and removing the clip, the yokes may be swiveled and the spring turned or reversed at will. Between the lower edge of the spring and yoke we place a washer, of vulcanized fiber or other like substance, to avoid rattling.

Yokes terminating in hooks for attachment of the tugs, embracing a rigid bar and pivotally connected with the ends of a spring behind said bar, will become entirely detached from the whiffletree upon the breakage or loss of the pivotal connection; but, according to our invention, should the pivot be broken or lost, there will still remain connection between the yoke and bar.

We do not claim a combination such as referred to having the spring behind the bar; but,

Having now described our invention, what we claim as new, and desire to secure by Letters Patent, is—

1. A whiffletree consisting of the combination of a rigid bar, a spring secured to the front side of said bar, and yokes pivotally connected with the spring embracing the bar and having connecting-bolts, substantially as described.

2. A whiffletree consisting of the combination of a rigid bar, a spring secured to the front side of said bar, yokes pivotally connected with the spring embracing the bar, and supplemental cushions or springs attached to the yokes, substantially as described.

In testimony whereof we affix our signatures in presence of two witnesses.

GEORGE B. N. DOW.
JOHN H. WILLEY.

Witnesses:
DANIEL H. MAXFIELD,
GEORGE H. ALLEN.